United States Patent [19]
Casturo et al.

[11] Patent Number: 5,444,902
[45] Date of Patent: Aug. 29, 1995

[54] CYLINDER ROUNDING/HOLDING TOOL

[75] Inventors: Scott E. Casturo, North Canton, Ohio; P. E. Lewis, Mt. Vernon, Ind.; E. V. Harlow, Norris City, Ill.; Gerald L. Olsen, Evansville, Ind.; E. Rod Hensley, Evansville, Ind.; Keith M. Wing, Evansville, Ind.

[73] Assignee: The United States of America as represented by the United States National Aeronautics and Space Administration, Washington, D.C.

[21] Appl. No.: 269,225

[22] Filed: Jun. 29, 1994

[51] Int. Cl.⁶ .............................................. B23Q 3/08
[52] U.S. Cl. ................................... 29/56.6; 29/33 T; 82/122; 228/44.5
[58] Field of Search ...................... 29/56.6, 56.5, 33 T, 29/33 O; 269/48.1; 279/2.06, 2.01; 72/466; 82/170, 122; 228/49.3, 44.5, 49

[56] References Cited

U.S. PATENT DOCUMENTS

| | | | |
|---|---|---|---|
| 3,259,964 | 7/1966 | Engel | 228/44.5 X |
| 3,979,041 | 9/1976 | Kaneyama et al. | 228/49 |
| 4,164,135 | 8/1979 | Clavin | 72/466 |
| 4,177,914 | 12/1979 | Clavin | 228/49 B |
| 4,337,932 | 7/1982 | Dennis et al. | 269/23 |
| 4,418,860 | 12/1983 | La Force | 228/44.5 X |
| 4,436,574 | 3/1984 | Long et al. | 156/415 |
| 5,285,947 | 2/1994 | Depperman | 228/49.3 |
| 5,356,067 | 10/1994 | Leduc | 228/49.3 X |

FOREIGN PATENT DOCUMENTS

| | | | |
|---|---|---|---|
| 39825 | 6/1965 | Germany | 82/122 |
| 22560 | 2/1983 | Japan | 29/56.6 |
| 182002 | 10/1984 | Japan | 82/122 |
| 473584 | 9/1975 | U.S.S.R. | 228/44.5 |
| 889361 | 12/1981 | U.S.S.R. | 228/44.5 |

Primary Examiner—William Briggs
Attorney, Agent, or Firm—Robert J. Edwards; D. Neil LaHaye

[57] ABSTRACT

A cylinder rounding/holding tool that is positioned in the center of the rotary table and bolted to a base plate for rigidity. The tool is formed from a metal frame that is circular on the inside diameter to form a locating boss and has flats on the exterior corresponding to the number of shoes required for the application. At each flat is a shoe that has two mechanical jacks (one at each end of the shoe) and a center guide tube. The jacks are powered by DC electric stepper motors that allow precise radial displacement of the shoes. The center guide tubes provide circumferential and axial load carrying capability and stability for the tool. The shoes are replaceable to allow machining to match the inner diameter of the cylinder being rounded. A computer controller may be used to control the stepper motors and a linear variable displacement transducer may be used for input to the computer controller and a real time feedback loop for roundness condition of the cylinder.

7 Claims, 2 Drawing Sheets

CYLINDER ROUNDING/HOLDING TOOL

BACKGROUND OF THE INVENTION

1. Field of the Invention

The invention is generally related to holding tools for machining parts and more particularly to a tool for rounding and/or holding a cylinder.

2. General Background

It is necessary in a variety of industries to work with a cylinder such as a pipe during machining of the cylinder to meet requirements for use. It is also sometimes necessary for the same holding tool to be used to cause rounding of the cylinder within very close tolerances. Especially for large diameter cylinders such as those used in rocket motors, pressure vessels, or large pipelines, it is difficult to find a tool that is can be set up in a reasonable amount of time, has repeatable accuracy, is reliable, and provides for ease of use without error. Such tools are commonly set up on a rotating table on which the cylinder is placed. There are several known approaches to such tools. One is the use of multiple jaws on the rotating table of the machine being used. Another is an internal thick walled cylinder with spider legs and mechanical adjustments with no centering capability. Another is the use of expansion rings where an internal rotating ring connected to shoes with rigid links causes expansion of shoes to a given diameter. Another is the use of pipes set across the diameter of the cylinder with threaded rods and nuts such that to move the cylinder radially outward, the nut is tightened against the pipe pushing the threaded rod against the cylinder. This approach is not very accurate and is very time consuming. Another approach has been to put a large, thick cylinder inside the cylinder being rounded and jacking between the two using a variety of jacking devices.

Although the above approaches provide "rounding", none center the part in the process of rounding, and most are labor and time consuming. Most are used in conjunction with chuck jaws attached to the turntable to assist in the rounding and centering process. The issue is that this eliminates the possibility of machining the bottom and the top of the cylinder in the same setup. None of the known devices allows a controlled movement for an infinite multitude of rounding and eccentric configurations of closed looped surfaces within one rounding tool.

For cylinders used in rocket motors, there is a need to round a large cylinder for three applications, one on a vertical boring machine, one on a horizontal boring machine, and the third on a horizontal lathe. In addition to the rounding function, the tool must also act as the chuck that holds the part to allow machining to be performed on the inside diameter and the outside diameter at both ends of the cylinder without requiring a second setup or readjustment of the part. The tool must provide sufficient rigidity or backing to allow machining of the cylinder without allowing the cylinder to deflect or vibrate. The tool must also hold the part on the center of the rotating table at each end of the cylinder.

SUMMARY OF THE INVENTION

The invention addresses the above need. What is provided is a cylinder rounding/holding tool that is positioned in the center of the rotary table and bolted to a base plate for rigidity. The tool is formed from a metal frame that is circular on the inside diameter to form a locating boss and has flat sides on the exterior corresponding to the number of shoes required for the application. At each flat is a shoe that has two mechanical jacks (one at each end of the shoe) and a center guide tube. The jacks are preferably powered by DC electric stepper motors that allow precise radial displacement of the shoes. The center guide tubes provide circumferential and axial load carrying capability and stability for the tool. The shoes are consumable and replaceable to allow them to be machined to match the inner diameter of the cylinder being rounded. A computer controller may be used to control the stepper motors.

BRIEF DESCRIPTION OF THE DRAWINGS

For a further understanding of the nature and objects of the present invention reference should be had to the following description, taken in conjunction with the accompanying drawing in which like parts are given like reference numerals, and wherein.

DETAILED DESCRIPTION OF THE PREFERRED EMBODIMENT

Figure 1:
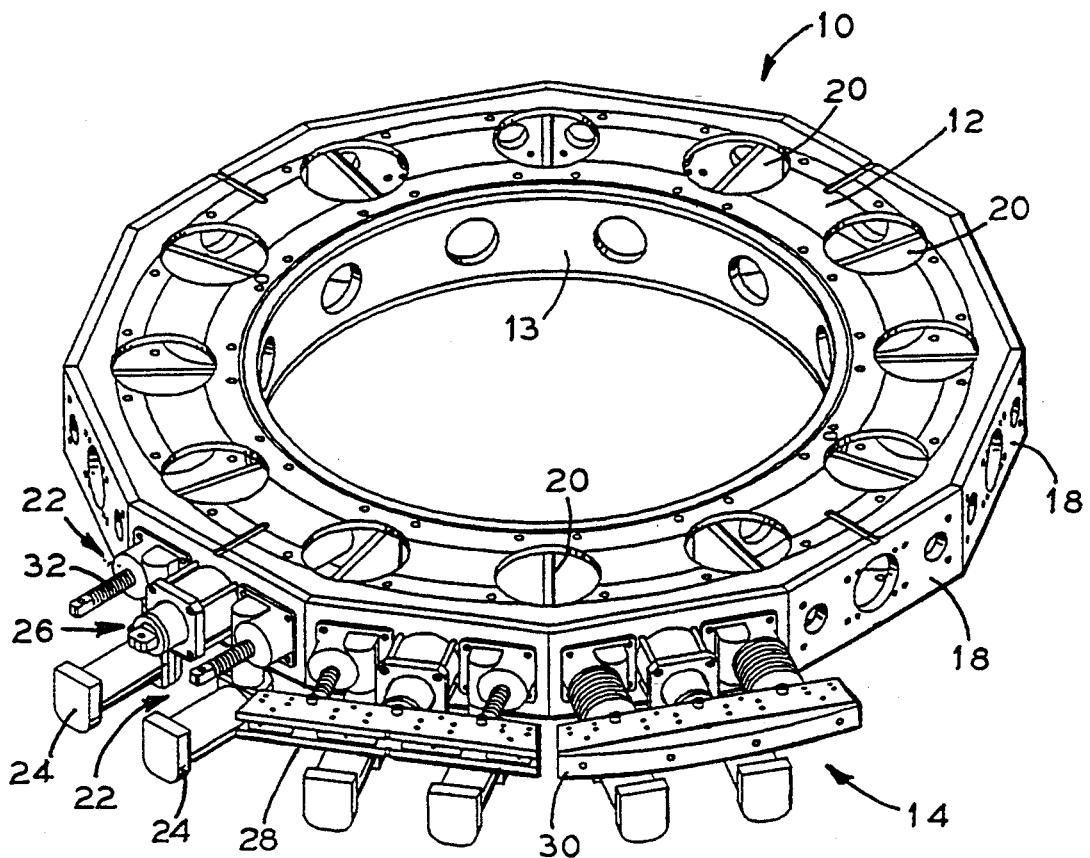
FIG. 1 is a perspective view of the invention.
Figure 2:
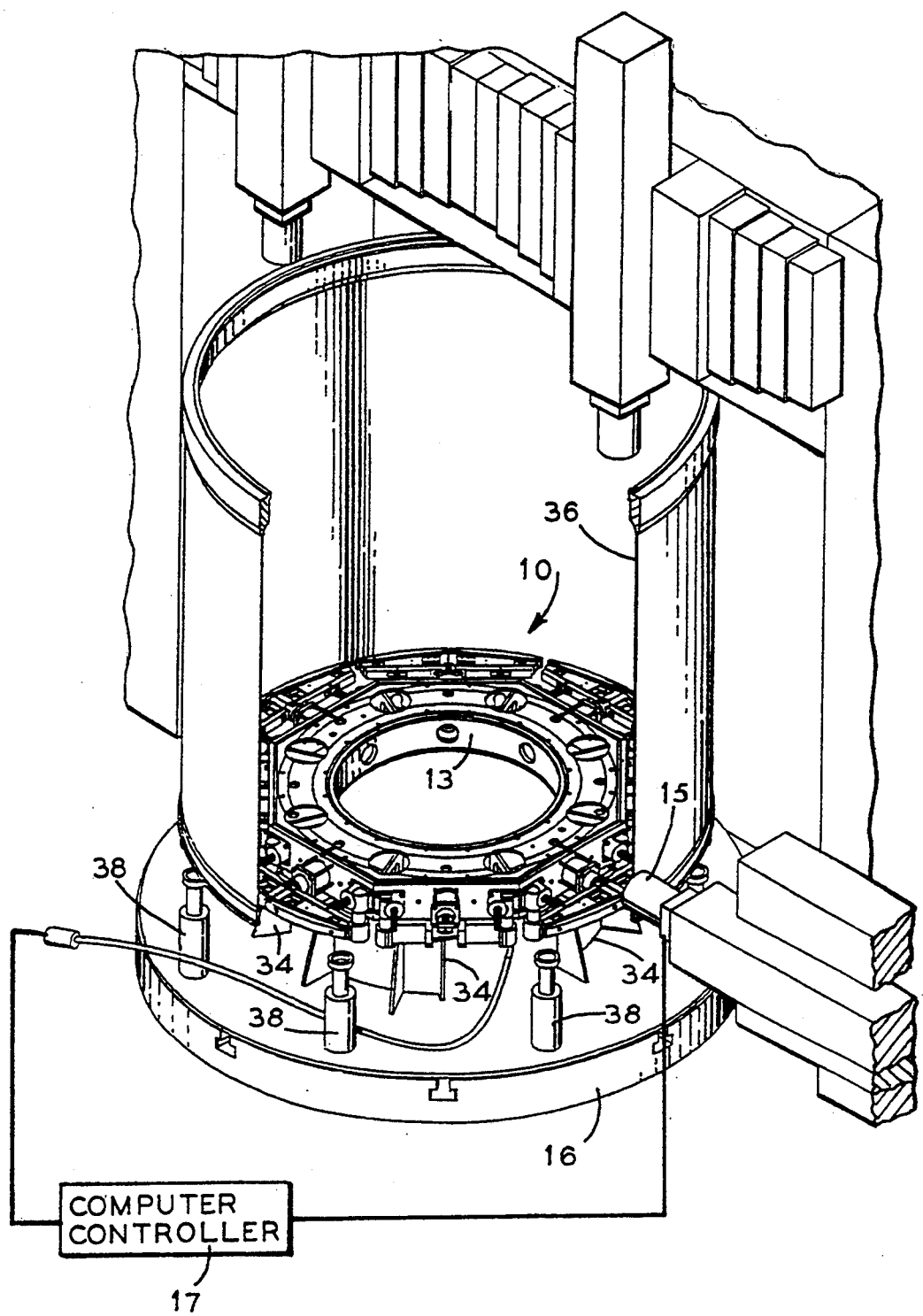
FIG. 2 a view of the invention in place on a rotary table and with a cutaway view of a cylinder work piece held in position.

Referring to the drawings, it is seen in FIG. 1 that the invention is generally indicated by the numeral 10. Cylinder rounding/holding tool 10 is generally comprised of frame 12 and a plurality of movable shoe assemblies 14. For ease of illustration, only one full and two partial shoe assemblies are shown in FIG. 1. As seen in FIG. 2, means for determining the actual roundness condition of the cylinder and controlling the shoe assemblies is provided in the form of linear variable displacement transducer (LVDT) 15 and computer controller 17, which provide a closed loop feedback and control system.

As best seen in FIG. 1, frame 12 is generally circular and is circular on the inside diameter to serve as a locating boss 13 for centering the cylinder workpiece as seen in FIG. 2. The circular locating boss allows use of two cylinder rounding/holding tools, one each at the top and bottom of the cylinder to insure the upper and lower ends are consistent and to allow work to be performed on both ends at the same time. A plurality of equally sized flat sides 18 are equally spaced around the exterior diameter of frame 12. The number of flat sides will depend upon the number of shoe assemblies required for the application. As seen in FIG. 1, twelve flats are provided while in FIG. 2 there are eight flats provided. A stiffener beam 20 that extends radially between the inner and outer diameter is provided at each corner of the outside flat sides 18.

Since all of shoe assemblies 14 are identical, only one shoe assembly will be described. Each assembly is formed from two mechanical jacks 22, a DC electric stepper motor 24 for each jack, a guide tube 26, jack plate 28, and shoe 30. As best seen in FIG. 1, jacks 22 are attached to frame 12 adjacent the ends of flat 18 and guide tube 26 is attached to frame 12 at the center of flat 18. A DC electric stepper motor is operatively engaged with each jack 22 for driving the jack screws 32 radially in and out. Jack plate 28 is attached to the end of jack screws 32 for movement therewith. Jack plate 28 is also attached to guide tube 26 substantially at the center of jack plate 28, but with the ability for the jack plate 28 to pivot depending on movement of the jack screws 32. Guide tube 26 has a central rod that is moves radially relative to frame 12 and provides circumferential and axial load carrying capability and stability for the shoe assembly. Shoe 30 is attached to jack plate 28 and has its outer curvature machined to match the inner diameter of the cylinder that is the workpiece. This provides for greater rounding accuracy. Shoe 30 is not permanently attached to jack plate 28. This allows for replacement of worn shoes or shoes of a different size or material to accommodate a cylinder with different size or material characteristics.

LVDT 15 is positioned to measure the radial position of the cylinder surface relative to the rotary axis of the cylinder as the cylinder is rotated. As seen in FIG. 2, LVDT 15 is held in a machine spindle to measure the radial position of the exterior of the cylinder surface. This is referred to as the total indicator reading (TIR). This information is received by computer controller 17, which is connected to LVDT 15 for receiving input therefrom and to all shoe assemblies 14. The information is correlated by the computer 17 in relation to the known circumferential and radial position of each shoe assembly 14. Computer controller 17 uses the information to individually control each motor 24 which causes the jacks 22 to move shoes 30 in or out as appropriate. The continued rotation of the cylinder causes an update of the roundness condition of the cylinder and the process can be repeated as necessary until the roundness of the cylinder is within the required tolerance.

In operation, cylinder rounding/holding tool 10 is bolted to support plates 34 on rotating table 16 as seen in FIG. 2. Support plates 34 are positioned such that tool 10 is centered on rotating table 16. Cylinder 36 is positioned on leveling jacks 38 which are attached to rotating table 16. Leveling jacks are used to level and position cylinder 36 relative to tool 10 such that the shoes 30 will contact cylinder 36 at a position that provides for rounding at the end while still allowing room for machining work at the end. These leveling jacks may be removed after rounding is accomplished for access to adjacent surfaces. Although not shown, a second tool 10 is used at the upper end of cylinder 36 so that work on the upper end may be performed simultaneously with the lower end. The two tools may be fixtured together via use of a spacer suited to the length of cylinder being accommodated. This is a feature not readily achievable in the prior art. A boss (not shown) received in the locating boss 13 of each tool insures that both tools and upper and lower ends of the cylinder are concentric. A computer controller is connected to the DC electric stepper motors and jacks for controlling and measuring movement of the jack screws. A linear variable displacement transducer may be attached to the jack screws to measure movement thereof and provide a means for obtaining a zero start position of the jacks. A tilt switch may be used on each jack plate 28 to confirm that both jacks are operating and prevent twisting of the shoe assembly in the event that only one jack or electric motor is operating. A homing sensor may also be used on each shoe assembly 14 to indicate when they are in the retracted position. The jacks 22 are preferably operated to extend shoes 30 in steps until contact is made with cylinder 36 to prevent any uneven contact with cylinder 36 that could damage the tool or cylinder. Jacks 22 provide radial load for the shoe assembly. Tests have shown that tool 10 is capable of rounding a cylinder of up to one hundred fifty inch inside diameter and holding it in place during machining operations without allowing the cylinder to deflect or vibrate while machining both top and bottom surfaces.

What is claimed as invention is:

1. A cylinder rounding/holding tool, comprising:
   a. a generally circular frame having a locating boss at the inner diameter and a plurality of flats around the exterior diameter;
   b. two jacks attached to said frame at each flat on said frame such that said jacks are movable radially relative to said frame;
   c. a motor operatively engaged with each jack for causing movement of said jacks;
   d. a guide tube assembly attached substantially at the center of each of said flats so as to be movable radially relative to said frame;
   e. a jack plate attached to each of said jacks and said guide tube assemblies; and
   f. a shoe attached to each of said jack plates.

2. The rounding/holding tool of claim 1, wherein each of said shoes have their outer surface machined to match the inner diameter of the cylinder being rounded or held by said rounding/holding tool.

3. The rounding/holding tool of claim 1, further comprising radial stiffener beams between the inner and outer diameter of said frame.

4. The rounding/holding tool of claim 1, further comprising:
   a. a linear variable displacement transducer positioned to measure the radial position of the cylinder surface relative to the rotary axis of the cylinder; and
   b. a computer controller connected to said transducer for receiving input therefrom and engaged with said motors for individually controlling each of said motors.

5. A cylinder rounding/holding tool, comprising:
   a. a generally circular frame having a locating boss at the inner diameter and a plurality of flats around the exterior diameter;
   b. two jacks attached to said frame at each flat on said frame such that said jacks are movable radially relative to said frame;
   c. a motor operatively engaged with each jack for causing movement of said jacks;
   d. a guide tube assembly attached substantially at the center of each of said flats so as to be movable radially relative to said frame;
   e. a jack plate attached to each of said jacks and said guide tube assemblies;
   f. a shoe attached to each of said jack plates;
   g. a linear variable displacement transducer positioned to measure the radial position of the cylinder surface relative to the rotary axis of the cylinder; and
   h. a computer controller connected to said transducer for receiving input therefrom and engaged with said motors for individually controlling each of said motors.

6. The rounding/holding tool of claim 5, wherein each of said shoes have their outer surface machined to match the inner diameter of the cylinder being rounded or held by said rounding/holding tool.

7. The rounding/holding tool of claim 5, further comprising radial stiffener beams between the inner and outer diameter of said frame.

* * * * *